Nov. 17, 1931.  T. SKUTTA  1,831,889
ELECTRICALLY HEATED COOKING APPLIANCE
Filed Nov. 1, 1929
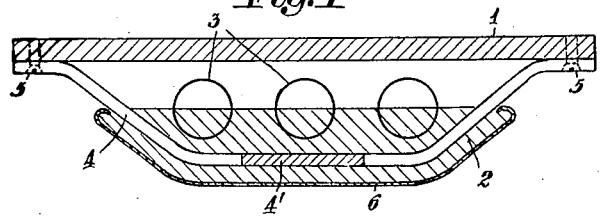
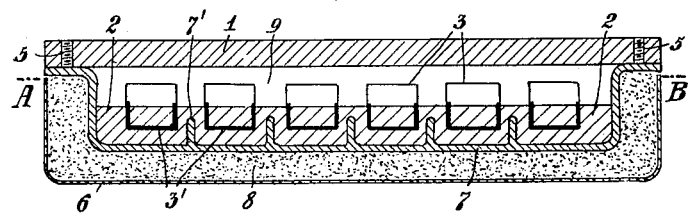
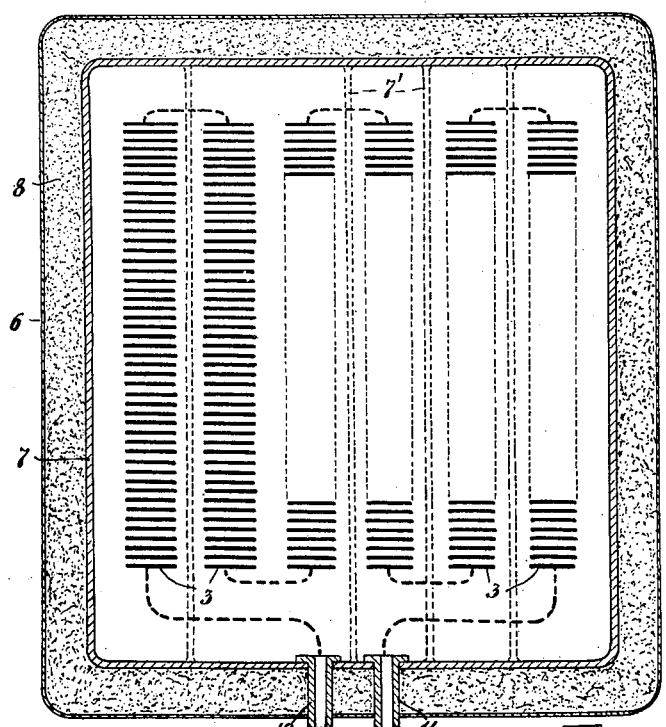
Inventor
Theodor Skutta
By Henry Le Thomson
his Attorney Patented Nov. 17, 1931

1,831,889

UNITED STATES PATENT OFFICE

THEODOR SKUTTA, OF VIENNA, AUSTRIA, ASSIGNOR TO THE FIRM ELEKTRA GES. M. B. H., BREGENZ, OF BREGENZ, AUSTRIA

ELECTRICALLY HEATED COOKING APPLIANCE

Application filed November 1, 1929, Serial No. 404,177, and in Austria August 21, 1929.

This invention relates to an electrically heated cooking appliance such as a hot plate, pan or the like. The invention consists in the combination with a closed cooking appliance made of a material having a high thermal conductivity of an electric heating device insulated from and acting on the appliance by heat radiation, such that the two form a single unit. The heating device used may for instance be an arrangement in which an insulating body is provided on the surface facing the cooking appliance with partially embedded and partially projecting heating coils and in which the insulating body is connected to the cooking appliance at a distance from the latter. In order that the heat reflected on to the insulating body or the heat purposely produced in it shall not be lost, the insulating body may be connected to the cooking appliance in a heat conductive manner, so that it is heated both my heat radiation and heat conductivity.

The accompanying drawings show two constructional examples of the invention, Fig. 1 showing one example in vertical section, Fig. 2 the second example in a similar section and Fig. 3 a cross-section on A—B of Fig. 2

In Fig. 1 of the drawings 1 is a solid hot plate made of a material having a high thermal conductivity, for instance cast iron, to the under side of which is fixed an electric heating device which acts by heat radiation. This heating device consists of an insulating body 2 consisting suitably of a plate or disc-shaped insulating material, for instance clay. This insulating body has on its surface facing the hot plate 1 any suitable number of electric heating coils 3 which are partially embedded in the material and partially project therefrom, preferably such that they are as near as possible to the hot plate 1 without being in contact with it. The insulating body 2 is fixed by means 4 and 5 to the hot plate 1 so as to form a single unit and is providedwith an outer casing 6, for instance of sheet metal.

The current conducted through the heating coil causes the uncovered part thereof to become incandescent and the hot plate is heated by radiation. As this heat is also reflected back on to the insulating body 2 and heats the latter, it is of advantage to transmit this heat as well to the hot plate 1 by heat conduction, for which purpose the connecting means 4 are made of a material having a high thermal conductivity. According to Fig. 1 the connecting means consist of arms 4 radiating from a disc 4', which are embedded in the insulating material 2. The connection with the hot plate 1 is established by means of the projecting parts.

In the constructional form shown in Figs. 2 and 3 the cross-section of the heating coils 3 is such that the embedded portion 3' has a somewhat greater cross-section than the exposed portion, so that in the insulating body 2 electrically produced heat is also generated, but to a smaller degree, which heats it (stored heat). This heat is also transmitted by heat conduction to the hot plate 1 in a very effective manner through the insulating body 2 being enclosed in a dish-like envelope 7 which is a good heat conductor and is made for instance of nickel, copper, chromium steel or the like on all sides with the exception of that facing the hot plate, the said envelope being connected at 5 to the hot plate 1 in any suitable manner. This envelope may be provided with ribs 7' or other projections which are embedded in the insulating body 2 and assist the conduction of heat to the hot plate. A heat insulating outer jacket 8, for instance of asbestos wool, kieselguhr or the like prevents radiation to the outside. 6 is an outer casing. 10 and 11 are the connections for the current conveying cables.

One advantage of the improved construction illustrated in Figs. 1 and 2 in which the electrical heating coils are partially imbedded in the body of the electrical insulating material is that the coils are positively held against displacement and more securely than by means of clips or by merely cementing the coils to the insulating support. Therefore, the coils may be arranged much closer to the hot plate than in former constructions, since displacement with consequent contact between the coils and the hot plate cannot occur. Furthermore, the body of electrical insulation such as clay or baked cement in which the coils are imbedded serves to absorb heat by conduction which is transmitted through the heat conducting support also partially imbedded in the insulating material to the hot plate. For example, after the current to the heat coils has been broken the absorbed heat will be dissipated through the heat conducting support to the hot plate.

In this arrangement the actual heating space 9 is entirely enclosed, so that there can be no considerable air currents and consequent considerable heat losses.

What I claim is:

1. In an electric heater the combination of a hot plate of heat absorbing and conducting material, a body of electrical insulation of heat absorbing material, electrical heat coils each coil of which is partially imbedded in the insulating body and supporting means of heat conducting material partially imbedded in the insulating material and extending to the hot plate whereby the hot plate is heated by direct radiation from the coils and through conduction of the absorbed heat from the insulating body through the supporting means to the hot plate.

2. In an electric heater according to claim 1 in which a portion of the heating coils which is imbedded in the insulating body has a greater cross section than the portion which is not imbedded whereby the heat is rapidly absorbed by the insulating body.

In witness whereof I have hereunto signed my name.

DR. THEODOR SKUTTA.